United States Patent [19]

Leiber

[11] Patent Number: 4,600,244
[45] Date of Patent: Jul. 15, 1986

[54] AUTOMOTIVE VEHICLE ANTI-BRAKE LOCK SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 737,155

[22] Filed: May 23, 1985

[30] Foreign Application Priority Data

May 26, 1984 [DE] Fed. Rep. of Germany ....... 3419714

[51] Int. Cl.⁴ .............................................. B60T 8/10
[52] U.S. Cl. .................................... 303/111; 303/105
[58] Field of Search ............. 188/181 C; 303/96–100, 303/103, 105, 106, 110, 111; 364/426

[56] References Cited

U.S. PATENT DOCUMENTS 4,093,317 6/1978 Lindemann et al. ................. 303/111
4,288,127 9/1981 Leiber et al. ......................... 303/111
4,374,421 2/1983 Leiber ............................ 303/111 X Primary Examiner—Duane A. Reger
Attorney, Agent, or Firm—Frishauf, Holtz, Goodman & Woodward

[57] ABSTRACT

To simplify the anti-lock brake system in which two brake circuits (I,II) are used, connected to diagonally located wheels (2,3; 1,4), magnetic valves are provided in which one braking circuit fully controls the wheels thereof and the wheels of the other braking circuits are controlled by a slave or follower valve system (9,10) which includes a biassed valve (10) controlling the braking pressure at the front wheel of the second braking circuit (1) with a difference pressure, so that the second slave control valve operates as a differential pressure control valve (10,32). The differential can be controlled as a function of absolute braking pressure, as sensed, for example, by a brake pressure piston (30) and a biassing spring (30a) therefor.

16 Claims, 3 Drawing Figures

FIG.1

AUTOMOTIVE VEHICLE ANTI-BRAKE LOCK SYSTEM

REFERENCE TO RELATED PUBLICATION

German Patent Publication Document DE-OS No. 24 33 092.

The present invention relates to braking systems for automotive vehicles and more particularly to an antilock braking system (ABS) which is suitable for use with two brake circuits.

BACKGROUND

An ABS for two brake circuits is described in the referenced German patent publication, DE-OS No. 24 33 092, in which a valve arrangement is disclosed and in which, upon a tendency of a wheel, or wheels, to block, pressure is suitably controlled in a specified manner. In particular, the braking circuits are so arranged that diagonally positioned wheels are associated with any one circuit. For example, the left front wheel and the right rear wheel are associated with a circuit I, and then the right front wheel and the left rear wheel are associated with a circuit II. If a tendency of a wheel having a brake in the brake circuit I to block is sensed, a slave control is provided which controls the braking pressure in the circuit II to be somewhat less than that of the braking circuit I. The system, additionally, permits alternate operation under "select low" and "select high" conditions, with respect to sensors which are used in the system, in other words, the sensitivity or degree of braking pressure control can be selected either automatically or under operator control.

Brake control systems are subject to severe requirements. The vehicle must, even under operation of the system, retain its operating stability, must be steerable, and, additionally, the braking distance should be a minimum. Such systems may become complex. Continued developments of such systems are intended to decrease the costs and the complexity thereof, without substantially impairing the effectiveness, although minor refinements of the characteristics may have to be sacrificed, particularly if made to simplification can be obtained thereby. One such system which includes simplification is described in the referenced patent document.

Systems have also been described in which diagonally arranged braking systems have separate control channels for each front wheel, and controlled braking pressure of a front wheel is then applied to the diagonally located rear wheel via a control element which is at least in part responsive to loading. Such systems do not entirely utilize the possible braking effect or braking effort of the rear wheels on the rear axle, particularly if the front wheel is also subject to engine braking, for example if the vehicle has front wheel drive. The vehicle operating characteristics may become critical if the optimum association of braking efforts in the front wheel brakes and rear wheel brakes is changed; this may be due to uncontrollable road surface conditions, inclination of the road surface or the like. The system described in the referenced German Patent publication document also may be subject to difficult operating effects under certain operating conditions of the vehicle.

THE INVENTION

It is an object to simplify an ABS for vehicles having diagonal braking circuits, and especially to provide an ABS with substantially reduced components without incurring difficult operating conditions above described. Operating stability, excellent steering response and short braking distances are to be maintained.

Briefly, each axle of the vehicle has only one magnetically controlled valve associated therewith, and the other wheel of the axle is controlled by a slave control valve applying braking pressure at a level which differs from that on the first wheel, typically at a lower level.

The system permits sensing the speed of the wheels not only at the wheels themselves but, rather, at a differential in a front wheel drive car, which substantially reduces costs and provides much better defined output signals than if wheel speed is sensed at a wheel itself. Sensing wheel speed at the wheel itself is difficult since the wheels and axles are subject to vibration. By use of suitable evaluation electronics, a gear within the differential can be used as a pulse source.

The system, in which a slave valve coupled to an electromagnetic control valve controls the braking pressure at a front, and, if necessary, front and rear wheel of a diagonally placed braking circuit, with a predetermined differential pressure, has the additional advantage that it can be readily combined with an electromagnetically controlled bypass valve which permits substantial reduction of components in connection with braking safety and the safety circuitry thereof, while ensuring vehicular driving and operating stability, excellent steerability and short braking distances. The operating conditions of the vehicle are better than with blocked wheels.

DRAWINGS

DETAILED DESCRIPTION

Figure 1:
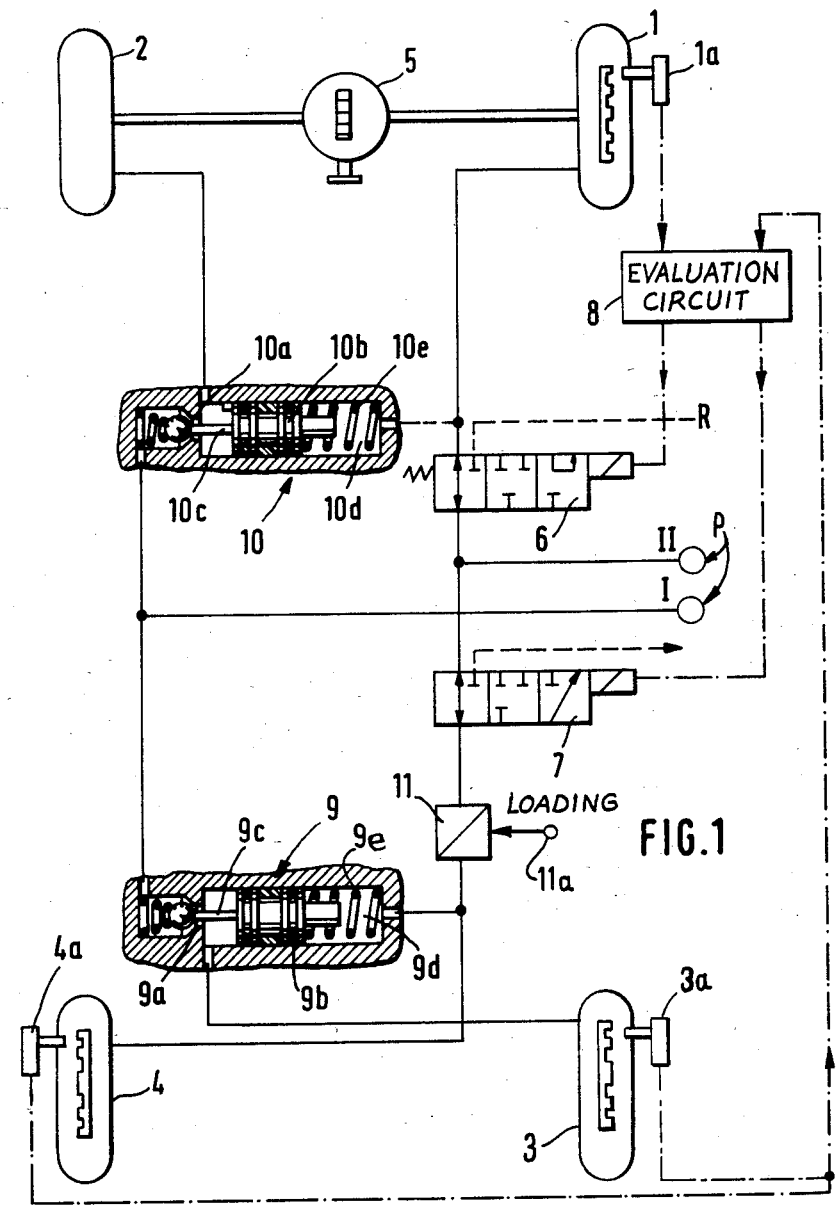
FIG. 1 is a schematic block diagram of an ABS.

FIG. 1 illustrates, schematically, right and left front wheels 1,2, driven through a differential 5, and trailing right and left rear wheels 3,4. The brakes of the diagonal wheels 1,4 are coupled to a braking circuit II, which may be an open braking circuit. Valves 6,7, shown as electromagnetically controlled three-position valves, are included in the braking circuit II. The valves 6,7 are electrically controlled from an evaluation circuit 8 which senses if there is a tendency of the wheels to block, based on wheel operating signals, and accordingly controlling the braking pressure at the associated brakes of the wheels 1,4. Wheels 1 and 4 have respective wheel speed sensors 1a,4a associated therewith. These wheel speed sensors provide wheel speed signals which are coupled to the evaluation circuit 8 to generate control signals to control the three-position valves 6,7. The valves 6,7 are so arranged that they can either provide pressurized brake fluid, maintenance of brake fluid pressure, or drainage of pressurized brake fluid, that is, drop of braking pressure. A return line R permits drainage of pressurized brake fluids, the pressurized brake fluids being supplied by a suitable source of pressurized brake fluid schematically illustrated as P.

The brakes of the diagonal wheels 2,3 are connected to a braking circuit I which, for example, may be a closed braking circuit. Brake pressure control valves 9,10 are included in the braking circuit I. Normally, changes in braking pressure in braking circuit II are reflected by the valves 9,10 and applied to the brakes of the wheels 2,3.

The brake controls apparatus of valve 9 and includes a valve element 9a which has a modulator piston 9b which normally retains the valve 9a open by a push rod 9c. A pressure reducer 11 is included in the brake pressure line of the circuit II between the valve 7 and the brake of rear wheel 4.

The brake control system 10 for the brake of the wheel 2 is similar to that of valve 9 for the wheel 3. The spring 10e, however, is differently dimensioned from the similar spring 9e so that the effect will be differentially pressure limiting, so that the unit will be effective as a differentially pressure limiting valve which, if there is a control effect, will control a braking pressure on the wheel 2 with a predetermined difference to the braking pressure effective on the brake of the wheel 1. A typical differential of pressure, for a vehicle, would be, for example, about 60 bar.

OPERATION

Let it be assumed that the conventional evaluation circuit 8 has sensed a tendency of one of the wheels from which it receives speed signals to block. If the pressure controlled by valve 7 and decreased by the pressure dropping element 11, and applied to the control chamber 9d of the unit 9 will become less than the pressure applied to the brake of the wheel 3, then, the modulator piston 9b will travel towards the right, thereby closing the normally open valve 9a and the pressure between the valve 9a and the brake of the wheel 3 will further decrease, due to excursion of the piston 9b further towards the right. The spring 9e acting on a piston 9b is so dimensioned that the pressure at the brake of the wheel 3 will generally be at least approximately similar to the pressure in the brake of the wheel 4. Due to the possibility of increase in volume at the left side of the piston 9b, it is possible to match the pressure on the brake of the wheel 3 towards lesser values if there is a sudden change in frictional coefficient between the wheel 3 and the operating surface, for example a portion of icy zone. The pressure in the wheel 3 can easily be selected to be less than that in the wheel 4. This is advantageous when the speed of wheel 3 is not sensed.

The valve 10 will operate this way: under ordinary braking conditions, the pressures at the left and right side of the piston 10b are equal. Upon drop of the pressure in the chamber 10d due to control effect of the evaluation circuit 8 by switching the control valve 6, for example, to the extreme not-shown position and, upon occurrence of the pressure difference determined by the spring constant of the spring 10e, e.g., about 60 bar in the example selected, valve 10a will close and consequently the pressure on the brake at wheel 2 is so controlled that it will be higher by 60 bar than the pressure at the wheel 1.

The pressure difference is necessary so that, for example if the vehicle makes a sharp right turn, and at an average, or high frictional coefficient between wheel and road surface on the wheel 2, which does not have a speed sensor associated therewith, pressure should be limited in order to prevent danger of wheel blocking. The wheel at the right, or inner curve, that is, wheel 1, is substantially freed from loading and can supply only a small proportion regarding lateral or curve-steering forces.

EMBODIMENT OF FIG. 2

The speed sensor is no longer associated with the front wheel 1' but, rather, a speed transducer 20 is provided, associated with a differential 5'. Speed transducer 20 thus does not sense the speed at one of the wheels but, rather, the speed of both of the front wheels. This has the advantage of improved signal output, since vibration at the axle of the wheels is eliminated; in a sensor arrangement such as well known in the art, for example as described in German Patent Publication Document DE-OS No. 24 33 092, it can provide for select-high and select-low.

Figure 2:
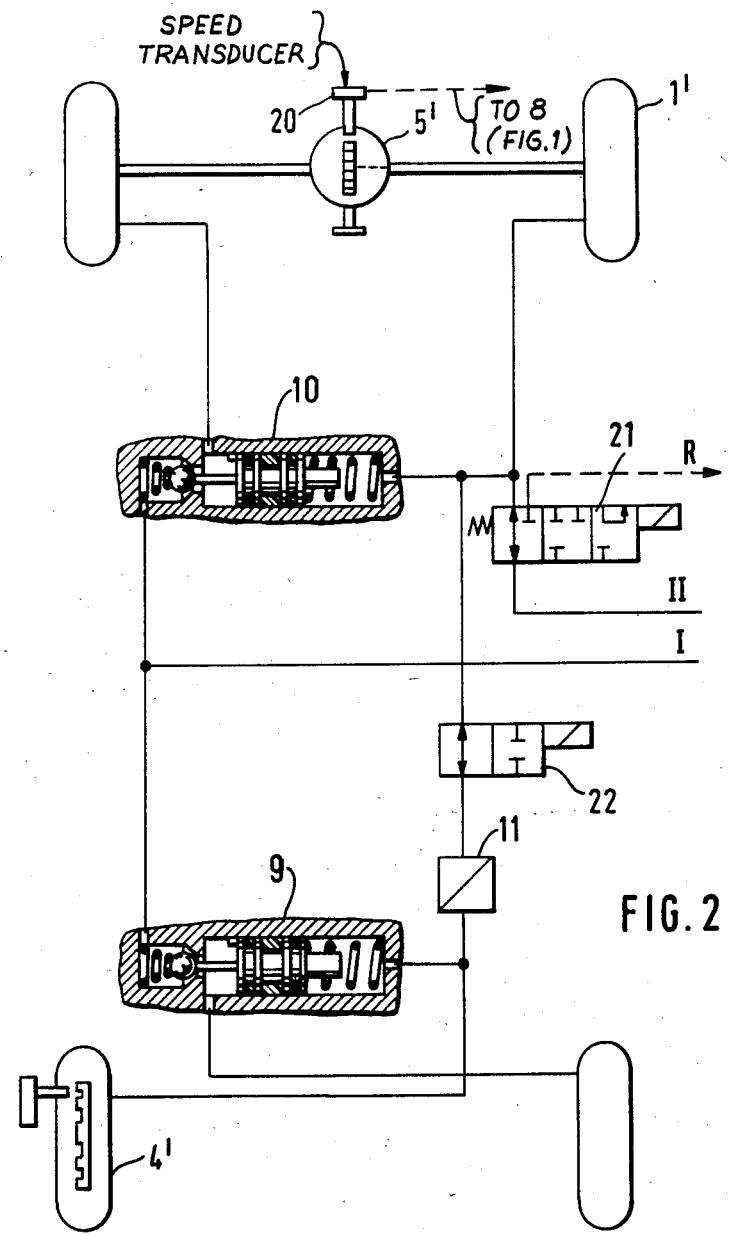
FIG. 2 illustrates a first modification of the ABS of FIG. 1.

The combination of the magnetic valves is, also, simplified in the embodiment of FIG. 2 over that of FIG. 1. Rather than using two three-valve units 6,7, a single three-valve unit 21 is provided for the wheel 1', and a two-position valve 22 for the left rear wheel 4'. The two-position valve 22 is connected to the output of the three-position valve 21. The wheel 1' is controlled, as before, by the ABS 8 (not separately shown in FIG. 2, and connected to the valves as in FIG. 1). The control for the left rear wheel 4' is somewhat more limited, however. If the magnetic valve 21 has commands for maintenance of pressure, or a drop of pressure, a command for the valve 22 to raise pressure cannot be carried out immediately. This somewhat minor disadvantage us, however, compensated by a lower complexity of the ABS evaluation circuit 8 and the valve 22.

EMBODIMENT OF FIG. 3

Figure 3:
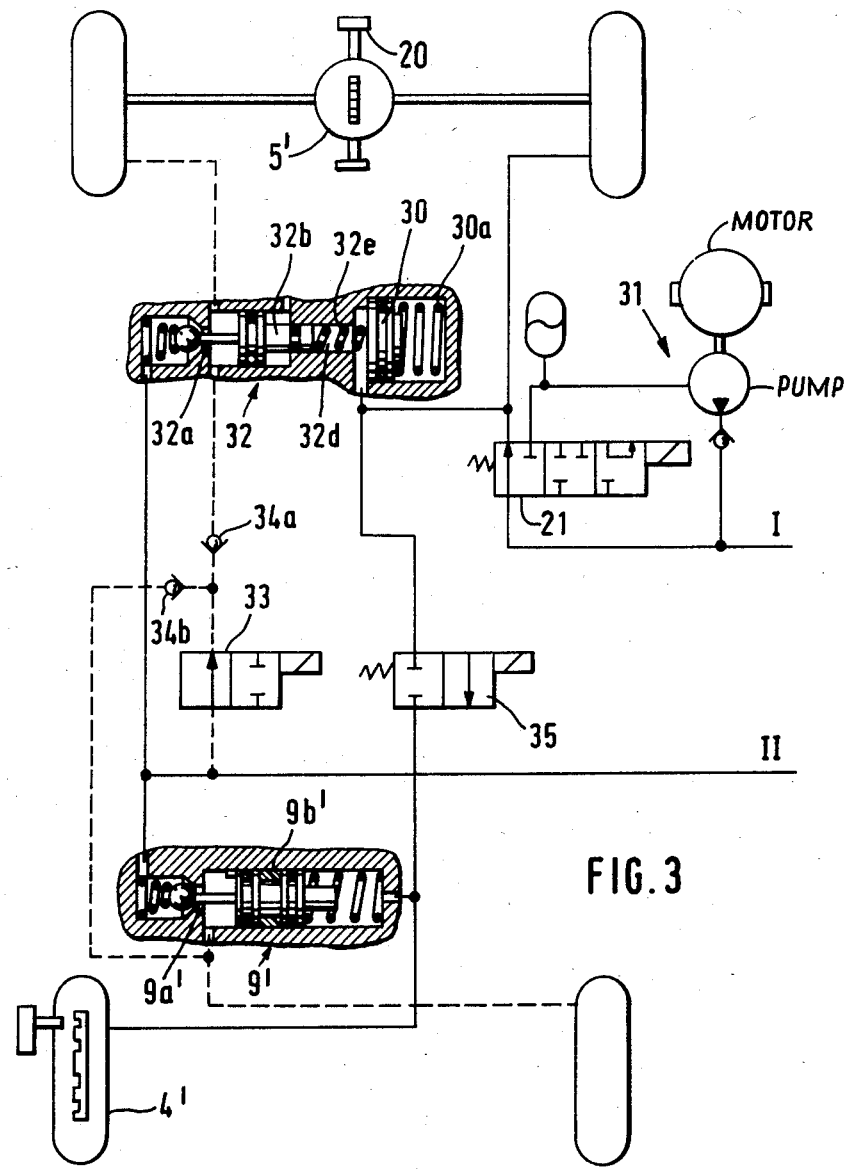
FIG. 3 illustrates another modification or embodiment of the system of FIG. 1.

The rear wheels in the embodiment of FIG. 3 are controlled in accordance with the same control concept as that of FIG. 2. The front wheel valve, in contrast, is different in that another biassed piston 30 is provided which supports a spring 32e, the spring 32e also engaging the modulator piston 32. Piston 32 is a stepped piston, which, therefore, has two different diameters on which pressure can act. The pressure at which the valve 32a closes then will depend on the level of the control pressure in the chamber 32d. Spring 30a is a strong spring so that, at low control pressure, the effect obtained in accordance with the embodiment of FIGS. 1 and 2—of pressure limiting—is retained.

OPERATION

At low pressures, the effect will be the same due to the strength of the spring 30a. At higher pressures, however, piston 30 will be forced towards the right, and the spring 32e loses its effect. The valve portion 32 now operates similar to a servo valve. This is particularly important if the front wheel is controlled by a sensor 20 coupled to the differential 5'. The control, thus, will have the effect that up to a predetermined pressure difference, which, for example, may be caused by a jump in friction between the wheel and the road surface, both wheels are prevented from blocking. No change-over between "select low" and "select high" is necessary, since, upon asymmetrical road surface and operation in "select low", control will start already at low pressures and the controlled wheel will receive the corresponding difference pressure and will block.

The rear axle is controlled in accordance with this principle.

The open braking circuit 1 has a return or drain system 31, which is shown in FIG. 3. A bypass valve, and check valves 34a, 34b likewise are illustrated for completeness. The bypass valve 33 is a magnetically operated valve, which, for selected periods of time, bridges the valves 9a and 32a of the brake control units 9' and 32. Under control conditions, it is switched over to permit the valves 9a and 32a to become effective. The ABS is disconnected, that is, if the valve 35 is deenergized for example, the bridging effect is obtained.

This is a safety feature which can become effective under malfunction conditions, for example by a "fail safe" operation of the valve 33 which, then, will bridge the brake control valve 9' and 32.

The magnet valve 22 of FIG. 2 corresponds to the valve 35 of FIG. 3. Valve 35 is so constructed that it permits fluid passage only upon being energized so that, at least at initiation of braking, it must be energized. In case of malfunction, it will drop out, thus providing for drainage of brake fluid to the brake of wheel 4' which ensures at least some lateral control of steering of the vehicle.

Various changes and modifications may be made and features described in connection with anyone of the embodiments may be used with any of the others, within the scope of the inventive concept. For example, the extent of pressure drop effected by element 11 (FIG. 1) can be made dependent on vehicle weight or loading, as schematically shown by control terminal 11a.

A suitable system switching over between "select high" and "select low", as well known in the art of automotive brake control, is described, for example in U.S. Pat. No. 3,797,892 (Leiber).

I claim:

1. Automotive vehicle wheel anti-lock brake system (ABS) in which two brake circuits (I, II) are provided, acting on first diagonally positioned front and rear wheels (1, 4) and second diagonally positioned front and rear wheels (2, 3) of the vehicle, having
   a least one rear speed wheel sensor (3a, 4a) coupled to at least one (4) wheels (3, 4) of the vehicle and providing a rear wheel speed signal;
   a front wheel speed sensor (1a, 20) coupled to at least one of the front wheels (1) of the vehicle and providing a front wheel speed signal;
   a first magnetic control valve (7, 22, 35) controlling brake fluid pressure at the first rear wheel (4, 4');
   a second control valve (9, 9') controlling brake fluid pressure to the second rear wheel (3), coupled to said first, magnetic control valve (7, 22, 35) and forming a first slave control valve, said second control valve controlling brake fluid pressure in the second rear wheel (3) as a function of the operation of the first, and magnetic control valve;
   and a speed signal processing and control signal generating circuit (8) receiving the wheel speed signals and providing output signals for controlling the first magnetic brake control valve (7, 22, 35) in dependence on the rotational behavior of the wheels, as sensed by said wheel speed signal sensors and provided to said signal processing and control signal generating circuit (8), said system comprising, in accordance with the invention,
   a third, and magnetic control valve (6, 21) controlling brake fluid pressure at the first front wheel (1), connected to and controlled by the speed signal processing and control signal generating circuit (8) and responding upon a tendency of said front wheel to lock;
   and a fourth control valve (10,32) controlling brake fluid pressure at the second front wheel (2) coupled to said third, and magnetic control valve (6) and forming a second slave control valve,
   said fourth control valve forming the second slave valve controlling brake fluid pressure in a brake associated with the second front wheel (2) to a level which differs from the brake pressure applied to the first front wheel (1).

2. System according to claim 1, including (FIG. 3) means (30) for sensing the braking pressure applied to said first front wheel (1,1') and controlling the difference value in braking pressure applied to the second front wheel (2) as a function of the braking pressure applied to the first front wheel (1).

3. System according to claim 1, wherein at least the third magnetic control valve (6,21) comprises a three-position valve connected for pressure rise, pressure level maintenance, and pressure drop of brake fluid pressure at the associated wheel.

4. System according to claim 1, wherein (FIG. 2) the third and magnetic control valve (21) comprises a three-positions valve for controlling pressure rise, pressure level maintenance and pressure drop at the brake of the first front wheel (1); and wherein the first magnetic control valve (22) comprises a two-position valve having a pressurized brake fluid passage position and a brake fluid blocking position, said two-position valve being connected to receive pressurized brake fluid from said third magnetic control valve (21) and controlling brake fluid pressure to the second rear wheel (4,4').

5. System according to claim 4, wherein the three-position magnetic control valve (21) is connected to the brake of the first front wheel (1') and the output of the two-position valve is connected with the brake of the rear wheel (4') which is directly opposite the first front wheel.

6. System according to claim 1, including a brake fluid pressure reducer (11) connected between the first magnetic control valve (7,22,35) and the associated rear wheel.

7. System according to claim 6, wherein said pressure reducer is a controllable pressure reducer, controlling the reduction of pressure as a function of vehicle weight or loading.

8. System according to claim 1, further including (FIG. 3) a safety valve (33) connected to bridge the second control valve (9 9') for the second rear wheel (3) upon switching off of the anti-lock brake system.

9. System according to claim 8, wherein, switching off of the anti-lock brake sysem application of pressurized brake fluid to the first rear wheel (4,4') is inhibited.

10. System according to claim 1, wherein the vehicle is a frontwheel drive vehicle having a front axle differential (5');
   and wherein the front wheel speed sensor (20) is coupled to the differential.

11. System according to claim 1, wherein the front wheel speed sensor (1a) is coupled to and senses the speed of the first front wheel (1,1').

12. System according to claim 1, wherein each of the rear wheels (3,4) have a rear wheel speed sensor (3a,4a) coupled thereto to provide respective rear wheel speed signals.

13. Method of controlling braking of an automotive vehicle, in which said automotive vehicle includes a wheel anti-lock brake system (ABS) in which two brake circuits (I,II) are provided, acting on first diagonally positioned front and rear wheels (1,4) and second diagonally positioned front and rear wheels (2,3) of the vehicle, having
- at least one rear speed wheel sensor (3a, 4a) coupled to at least one (4) of the rear wheels (3, 4) of the vehicle and providing a rear wheel speed signal;
- a front wheel speed sensor (1a, 20) coupled to at least one of the front wheels (1) of the vehicle and providing a front wheel speed signal;
- a first magnetic control valve (7,22,35) controlling brake fluid pressure at the first rear wheel (4,4');
- a second control valve (9,9') controlling brake fluid pressure to the second rear wheel (3), coupled to said first magnetic control valve (7,22,35) and forming a first slave control valve, said second control valve controlling brake fluid pressure in the second rear wheel (3) as a function of the operation of the first, and magnetic control valve;
- and a speed signal processing and control signal generating circuit (8) receiving the wheel speed signals and providing output signals for controlling the first magnetic brake control valve (7,22,35) in dependence on the rotational behavior of the wheels, as sensed by said wheel speed signal sensors and provided to said signal processing and control signal generating circuit (8), comprising, in accordance with the invention, the step of controlling brake fluid pressure at the first front wheel (1) upon response of the speed signal processing and control signal generating circuit (8) sensing a tendency of said front wheel to lock, and controlling the brake fluid pressure at the secod front wheel (2) at a level which differs from the braking pressure applied to said first front wheel and at a lower level.

14. Method according to claim 13, including the step of sensing braking pressure applied to said first front wheel (1) and controlling the difference in braking pressure applied to said second front wheel (2) as a function of absolute braking pressure applied to the first front wheel.

15. Method according to claim 13, including the step of controlling braking pressure to the second rear wheel (3) independently of the operation of the first magnetic control valve upon sensing of malfunction, or inoperativeness, or non-connection of the signal processing and control signal generating circuit.

16. Method according to claim 13, wherein the vehicle is a front-wheel drive vehicle having a front-wheel differential (5');

and the at least one front wheel speed signal is generated by sensing the speed of a gear within said differential.

* * * * *